United States Patent
Thiel et al.

(10) Patent No.: US 7,578,288 B2
(45) Date of Patent: Aug. 25, 2009

(54) METHOD FOR OPERATING AN INTERNAL COMBUSTION ENGINE, COMPUTER PROGRAM PRODUCT, COMPUTER PROGRAM, AND CONTROL AND/OR REGULATING DEVICE FOR AN INTERNAL COMBUSTION ENGINE

(75) Inventors: Christof Thiel, Heilbronn (DE); Matthias Heinkele, Weil der Stadt (DE); Andreas Bethmann, Ditzingen (DE); Kai Jakobs, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 116 days.

(21) Appl. No.: 11/704,610

(22) Filed: Feb. 8, 2007

(65) Prior Publication Data

US 2007/0199553 A1    Aug. 30, 2007

(30) Foreign Application Priority Data

Feb. 20, 2006    (DE)    ........................ 10 2006 007 698

(51) Int. Cl.
*F02D 41/00*    (2006.01)
(52) U.S. Cl. .................... 123/690; 123/688; 701/114
(58) Field of Classification Search ............... 123/479, 123/688, 690, 396; 701/114; 73/114.01, 73/114.36; 702/182, 183, 185
See application file for complete search history.

(56) References Cited

U.S. PATENT DOCUMENTS

| | | | | | |
|---|---|---|---|---|---|
| 4,121,548 | A | * | 10/1978 | Hattori et al. | 123/479 |
| 5,568,725 | A | * | 10/1996 | Uchikawa | 60/274 |
| 5,758,632 | A | * | 6/1998 | Yamashita et al. | 123/688 |
| 5,918,584 | A | * | 7/1999 | Kato | 123/681 |
| 6,032,659 | A | * | 3/2000 | Yamashita et al. | 123/674 |
| 6,138,638 | A | * | 10/2000 | Morikawa | 123/295 |
| 6,470,868 | B2 | * | 10/2002 | Nakagawa et al. | 123/673 |
| 6,904,792 | B2 | * | 6/2005 | Wakahara | 73/114.39 |
| 7,063,081 | B2 | * | 6/2006 | Yamada | 123/688 |
| 7,254,474 | B2 | * | 8/2007 | Iihoshi et al. | 701/109 |
| 7,412,820 | B2 | * | 8/2008 | Iida et al. | 60/274 |

* cited by examiner

*Primary Examiner*—Stephen K Cronin
*Assistant Examiner*—Sizo B Vilakazi
(74) *Attorney, Agent, or Firm*—Kenyon & Kenyon LLP

(57) ABSTRACT

In a method for operating an internal combustion engine, a sensor for detecting and/or an actuator for setting a performance quantity of the internal combustion engine is/are monitored for the presence of a malfunction. Monitoring is performed at a first operating point of the internal combustion engine at a lower load and at an operating point of the internal combustion engine at a higher load. The two operating points are set alternatingly, and at least one of the two operating points is set multiple times for a single monitoring operation.

13 Claims, 2 Drawing Sheets

METHOD FOR OPERATING AN INTERNAL COMBUSTION ENGINE, COMPUTER PROGRAM PRODUCT, COMPUTER PROGRAM, AND CONTROL AND/OR REGULATING DEVICE FOR AN INTERNAL COMBUSTION ENGINE

BACKGROUND OF THE INVENTION

1. Field of the Invention

The present invention relates to a method for operating an internal combustion engine, to a computer program product, a computer program, and a control and/or regulating device for an internal combustion engine.

2. Background Information

Monitoring a sensor for detecting and/or an actuator for setting a performance quantity of an internal combustion engine for the presence of a malfunction is known, monitoring being performed at a first operating point of the internal combustion engine at a lower load and at a second operating point of the internal combustion engine at a higher load.

It is known, for example, to learn, via adaptation, a deviation in charge detection or in the mixture composition to be set. In this case a distinction is made between basically two learning areas. First, a so-called additive offset error in a characteristic curve of a sensor for detecting the charge or in a characteristic curve of an actuator for setting the mixture composition is learned in the idling range, and second, a so-called multiplicative slope error of the corresponding characteristic curve is learned in the partial load range. In the case where the internal combustion engine propels a vehicle, these deviations are learned in the driving operation when the driver idles or drives at partial load in these operating ranges. Previously the additive offset error of the corresponding characteristic curve was learned at the end of the assembly line or in a repair shop for a single monitoring operation only once in an idling phase and then additionally when the engine was brought to a partial load point with the aid of a chassis dynamometer to learn the multiplicative slope error of the corresponding characteristic curve. The engine is brought to each operating point only once. As a result, the above-named adaptation of the additive offset error or of the multiplicative slope error is occasionally not learned absolutely correctly because when the engine is brought to the corresponding operating range only once, the error of the previously set operating range of the internal combustion engine is also always learned at the same time. For example, initially not only the multiplicative slope error is thus learned at the partial load point, but also, simultaneously, the additive offset error remaining from the previous adaptation in the idling operating state.

BRIEF SUMMARY OF THE INVENTION

The method according to the present invention for operating an internal combustion engine, the computer program product according to the present invention, the computer program according to the present invention, and the control and/or regulating device according to the present invention for an internal combustion engine have the advantage over the related art that both operating points are set alternatingly and at least one of the two operating points is set multiple times for a single monitoring operation. In this way it may be ensured that in the case where adaptation of the sensor for detecting and/or of the actuator for setting a performance quantity of the internal combustion engine takes place during monitoring, the accuracy of this adaptation is increased. The additive offset error is better separated from the multiplicative slope error, and after the engine is brought to both operating points multiple times for a single monitoring operation, the adaptation values for the additive offset error and the multiplicative slope error settle at the correct values, so that the additive offset error may be adapted without being influenced by the multiplicative slope error and vice-versa.

It is advantageous in particular if an idling operating point is selected as the first operating point and a partial load operating point, in particular close to idling, of the internal combustion engine is selected as the second operating point. This makes it possible to perform the monitoring and/or adaptation according to the present invention in the case of a vehicle propelled by the internal combustion engine while the vehicle is at a standstill without movement of the vehicle on the road or on a chassis dynamometer being required. For this purpose, the second operating point may be selected as a partial load operating point close to idling in particular.

The second operating point may be set for this purpose, for example, by raising the engine speed and/or by applying a torque reserve from the first operating point. This permits a partial load operating point to be set in a particularly easy manner without a gear being selected, which does not yet result in vehicle movement, so that the vehicle does not move. In particular by applying the torque reserve, more charge and fuel may be introduced into a combustion chamber of the internal combustion engine for the same torque output of the internal combustion engine and thus the load may be increased and a partial load operating point of the internal combustion engine, one close to idling in particular, may be set based on the idling operating point, for example, as the second operating point.

It is furthermore advantageous if the performance quantity measured by the sensor and/or set by the actuator is compared to a value predefined for the particular operating point and if the sensor and/or the actuator are adapted to correct the difference between the measured or set performance quantity and the predefined value. This permits an adaptation of the sensor and/or the actuator to be performed in a simple way during monitoring.

Another advantage is that, in the case where after the end of the adaptation the absolute value of the change due to the adaptation of the offset or due to the adaptation of the slope is greater than a particular predefined value, an error is recognized. This permits a very simple, sturdy, and reliable error diagnosis to be performed.

Another advantage is that, in the case where after the end of the adaptation the absolute value of the change due to adaptation of the offset or to the adaptation of the slope is less than a particular predefined value, no error is recognized. This permits a test for the absence of errors in the sensor and/or the actuator to be performed in a simple way within the monitoring.

It is furthermore advantageous if a characteristic curve of the sensor and/or the actuator is adapted, an additive offset error being adapted at the first operating point and a multiplicative slope error being adapted at the second operating point. In this way a largely accurate and error-free adaptation of the characteristic curve of the sensor and/or of the characteristic curve of the actuator is possible.

It is furthermore advantageous that in the case where a change over time in the absolute value of the adaptation value is less than a predefined value at one of the two operating points, the adaptation process at this operating point is terminated at least temporarily, it is switched over to the other of the two operating points and the adaptation process is performed or resumed for this other of the two operating points. This permits the adaptation of the sensor and/or the actuator to be automated and the adaptation operations to be completed in the shortest possible time and with the greatest possible accuracy.

Another advantage results when the two operating points are alternatingly set for monitoring until a predefined number of operating point changes is reached. When the number of operating point changes is suitably predefined, this permits a compromise between accuracy of adaptation and/or monitoring on the one hand and speed of adaptation and/or monitoring on the other hand to be achieved.

It is furthermore advantageous when one or more actuator(s) and/or one or more sensor(s) are monitored simultaneously. This permits the time required for monitoring and/or adaptation of a plurality of actuators and/or sensors at the end of the assembly line or in the repair shop to be substantially reduced compared to sequentially performed monitoring and/or adaptation.

DETAILED DESCRIPTION OF THE INVENTION

Figure 1:
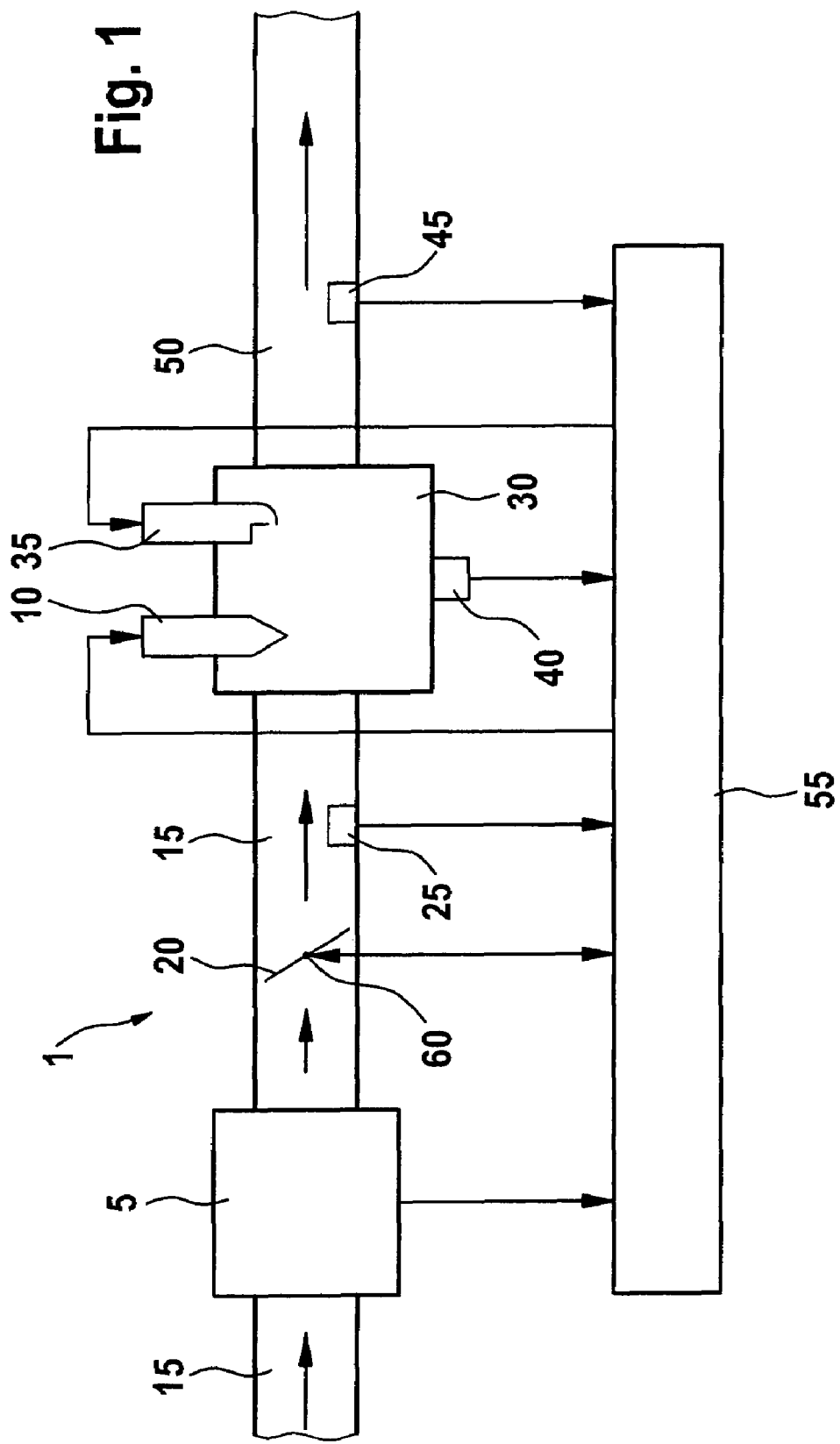
FIG. 1 shows a block diagram of an internal combustion engine.

In FIG. 1, the reference numeral 1 identifies an internal combustion engine, which propels a vehicle, for example. Internal combustion engine 1 may be designed as a gasoline engine or a diesel engine, for example. In the following it will be assumed, for example, that internal combustion engine 1 is designed as a gasoline engine. Internal combustion engine 1 includes one or more combustion chamber(s) 30, each of which is situated in a cylinder. FIG. 1 shows only one combustion chamber 30 for the sake of clarity. Fresh air is supplied to combustion chamber 30 via an air supply 15. The flow direction of the fresh air in air supply 15 is indicated by arrows in FIG. 1. A throttle valve 20, which influences the air mass flow to combustion chamber 30 as a function of its position, is situated in air supply 15. The position of throttle valve 20 is set by an engine controller 55, for example, and as known to those skilled in the art, as a function of the position of an accelerator pedal (not depicted in FIG. 1). Furthermore, throttle valve 20 provides a position feedback on its actual position to engine controller 55. Upstream from throttle valve 20, there is an air mass meter 5 in air supply 15, for example, in the form of a hot-film air mass flow meter or an ultrasound air mass flow meter, which measures the instantaneous air mass flow to combustion chamber 30 and sends it to engine controller 55 in the form of a measuring signal. Downstream from throttle valve 20, optionally a pressure sensor 25, which measures the instantaneous intake manifold pressure at this point and sends it in the form of a measuring signal to controller 55, is situated in air supply 15. Fuel is injected into combustion chamber 30 via an injector 10. Alternatively, the fuel may also be injected into air supply 15 downstream from throttle valve 20. This area of air supply 15 is also known as the intake manifold. Injector 10 is also activated by engine controller 55 to make a desired injected quantity available, for example, to set a predefined air/fuel mixture ratio. The air/fuel mixture formed in combustion chamber 30 is ignited by a spark plug 35. Spark plug 35 is also activated by engine controller 55, for example, to set a predefined combustion efficiency or a predefined torque reserve. The instantaneous speed of internal combustion engine 1 is detected by an engine speed sensor 40 in the area of combustion chamber 30 and relayed to engine controller 55 as a measuring signal. The exhaust gas formed in combustion chamber 30 in the combustion of the air/fuel mixture is expelled into an exhaust tract 50. The flow direction of the exhaust gas in exhaust tract 50 is also indicated in FIG. 1 by arrows. A lambda sensor 45, which measures the instantaneous oxygen level in exhaust tract 50 and relays a corresponding measuring signal to engine controller 55, is situated in exhaust tract 50.

According to the present invention, a sensor of internal combustion engine 1 for detecting a performance quantity of internal combustion engine 1 and/or an actuator of internal combustion engine 1 for setting a performance quantity of internal combustion engine 1 is monitored for the presence of a malfunction. The sensor may be, for example, an air mass flow meter 5 or an intake manifold pressure sensor 25 or a lambda sensor 45 or an engine speed sensor 40 or a sensor for detecting the position of throttle valve 20, for example, a throttle valve potentiometer. In the following we shall assume as an example that the sensor to be monitored is a sensor for detecting the position of throttle valve 20 as a performance quantity of internal combustion engine 1, for example, such as a throttle valve potentiometer. Such a throttle valve potentiometer is labeled in FIG. 1 with reference numeral 60.

Throttle valve 20 or injector 10 may be selected, for example, as the actuator for setting a performance quantity of internal combustion engine 1. In the following, we shall assume as an example that the actuator for setting the performance quantity of internal combustion engine 1 to be monitored is injector 10, which sets the injected quantity or the oxygen concentration in the exhaust gas as the performance quantity of internal combustion engine 1.

The term monitoring is to be understood in the present description and in the claims not only as error diagnosis, but alternatively also as error adaptation of the sensor to be monitored or the actuator to be monitored. The term malfunction means in the present description and the present claims not only an error of the sensor or actuator to be monitored that is not to be corrected or is uncorrected, but alternatively also a deviation to be adapted or corrected between a measured or set performance quantity and a predefined value.

Furthermore, the sensor or actuator is monitored both at a first operating point of internal combustion engine 1 at low load and at an operating point of the internal combustion engine at a higher load. According to the present invention, both operating points are then set alternatingly, and at least one of the two operating points is set multiple times for a single monitoring operation, i.e., for example, a single adaptation or a single error diagnosis of the sensor or the actuator.

In the following it is assumed as an example that the sensor has a characteristic curve which assigns each electrical signal value of the sensor to an associated value of the performance quantity to be detected by the sensor. In the case of throttle valve potentiometer 60, a characteristic curve is thus provided, which assigns a value for the position of throttle valve 20 and, taking into account the pressure upstream and downstream from throttle valve 20 and the temperature upstream from throttle valve 20 as known to those skilled in the art, a value for the air mass flow to each signal of throttle valve potentiometer 60. In this example, erroneous deviations from the characteristic curve are assumed to be linear. For example, a slope error of 10% may thus be present in particular in addition to an error offset. Slope and offset refer to the particular value of the air mass flow assigned to the position of throttle valve 20.

Furthermore, a characteristic curve, which assigns a particular value of the performance quantity to be set by the actuator to different values of an electrical manipulated variable of internal combustion engine 1, is assigned to the actuator. In the present example, a characteristic curve of injector 10 is thus provided, which assigns an injected quantity or oxygen concentration in the exhaust gas to different values of the electrical trigger signal of injector 10 as a function of the pressure in the fuel supply. In the following it is assumed that erroneous deviations from the characteristic curve of injector 10 are also linear.

Linear errors may be adapted, on the one hand, regarding their offset and, on the other hand, regarding their slope. The offset is usually adapted additively and the slope is usually adapted multiplicatively. The adaptation of an additive offset error of such a linear error may be best adapted at an idling operating point of the internal combustion engine at which the multiplicative slope error has a lesser effect. Therefore, in the present example, the idling operating point is selected using a set predefined idling speed as the first operating point of the internal combustion engine. In contrast, for the adaptation of the multiplicative slope error, a partial load operating point of internal combustion engine 1 is suitable at which the air mass flow is greater by a factor of more than 10 than at the idling operating point because the additive offset error has no effect there. However, should adaptation be performed without a gear having been selected and with the vehicle advantageously at a standstill, such a partial load operating state is not settable for the adaptation of the multiplicative slope error. In that case, the second operating point is rather selected in such a way that, if no gear has been selected, the maximum possible air mass flow to the internal combustion engine at the highest possible engine speed (which, however, is lower in new vehicles than in comparable older vehicles) is set, the maximum possible air mass flow being less than 10 times the air mass flow at the idling operating point. An operating point close to idling may, however, also be selected as the second operating point, i.e., with a maximum air mass flow which is in particular considerably lower than the one described above, and an engine speed that is possibly close, at least closer than at the previously described partial load operating point, to the predefined idling speed.

In any case, the second operating point is selected in such a way that the load, i.e., the engine load, at the second operating point is greater than at the first operating point.

The partial load operating point close to idling may be set for this purpose by raising the engine speed compared to the idling operating point and/or by applying a torque reserve. In the second case, the ignition angle is retarded and, at the same time, the charge of combustion chamber 30 is increased by appropriately activating throttle valve 20 and the fuel supply to combustion chamber 30 is increased via appropriate activation of injector 10 in such a way that the torque output by internal combustion engine 1 remains constant. An operating point having a higher load compared to the idling operating point due to the increased charge and fuel supply is thus obtained as the second operating point. According to the present invention, the performance quantity measured by the sensor and/or set by the actuator is compared with the predefined value for the particular first or second operating point. A value for the instantaneous air mass flow to combustion chamber 30 is thus modeled as known to those skilled in the art from the position of throttle valve 20 ascertained by throttle valve potentiometer 60 and the intake manifold pressure measured by intake manifold pressure sensor 25. This value is compared with the value measured by air mass flow meter 5. Thus, in the end, the performance quantity measured by throttle valve potentiometer 60 according to the described modeling is the air mass flow to combustion chamber 30, which is compared to the air mass flow measured by air mass meter 5 as a predefined value. If the absolute value of the difference between the modeled value for the air mass flow and the air mass flow measured by air mass flow meter 5 is greater than a predefined threshold value for the particular operating point, engine controller 55, which performs both the described modeling and the monitoring, recognizes a malfunction of throttle valve potentiometer 60, provided air mass flow meter 5 is working error-free. The error-free state of air mass flow meter 5 may be recognized by controller 55 by the fact that the oxygen level in exhaust tract 50 ascertained by lambda sensor 45 coincides with a value of the oxygen concentration predefined for the instantaneous operating point in question of the internal combustion engine within a predefined tolerance margin without a regulating intervention of a lambda regulator being required. In the event of a defective air mass flow meter 5, fuel quantity 10 to be injected would also be erroneously set and thus an oxygen concentration different from the predefined oxygen concentration would be detected in the exhaust gas. The described monitoring of throttle valve potentiometer 60 is therefore performed only if the air mass flow meter is found to be error-free. Otherwise it would not be possible to monitor the signal of throttle valve potentiometer 60 together with the signal of air mass flow meter 5 for a malfunction of throttle valve potentiometer 60 as described above.

Alternatively, the intake manifold pressure may also be modeled as known to those skilled in the art from performance quantities of the internal combustion engine. Intake manifold pressure sensor 25 is not needed in this case. However, if no air mass flow meter is installed, but rather intake manifold pressure sensor 25, the air mass flow may also be modeled from the measured intake manifold pressure as known to those skilled in the art.

Initially the additive offset error is now adapted at the idling operating point and the multiplicative slope error of the characteristic curve of throttle valve potentiometer 60 is adapted at the partial load operating point close to idling as the second operating point to compensate for the deviation of the modeled value of the air mass flow from the value of the air mass flow measured by air mass flow meter 5.

For this purpose, the idling operating state is initially set. The offset of the characteristic curve of throttle valve potentiometer 60 is then adapted until the absolute value of a change in the adaptation value over time, i.e., of a change in the offset of the characteristic curve of throttle valve potentiometer 60 over time is less than a predefined threshold value. As soon as this is the case, the adaptation operation for this idling operating point is at least temporarily terminated and a switchover occurs to the partial load operating point close to idling as the second operating point. The multiplicative slope error of the characteristic curve is then adapted there, again until the absolute value of the change in the adaptation value over time at the second operating point, i.e., of the change in the slope of the characteristic curve of throttle valve potentiometer 60 over time is less than an associated predefined value. If this is the case, a switchover occurs to the idling operating state again and the adaptation of the additive offset error is resumed as described above. Switchover between the two operating points and the adaptation performed there advantageously continues until a predefined number of operating point changes is reached. The adaptation is then terminated for both operating points. The described adaptation until the predefined number of operating point changes is reached represents a single monitoring operation or one full adaptation.

If, after the end of the full adaptation, the absolute value of the change in the offset or in the slope due to the full adaptation of the offset or due to the full adaptation of the slope is greater than a particular predefined value, controller 55 recognizes a error. The particular predefined value may be suitably calibrated on a test bench, for example. For example, the error is displayed to the driver of the vehicle and, if necessary, results in a limp-home operation of internal combustion engine 1. This limp-home operation may mean, for example, that in the following the signal of air mass flow meter 5, instead of the signal of throttle valve potentiometer 60, is used for determining the air mass flow. However, if, after the end of the full adaptation, the absolute value of the change due to both the full adaptation of the offset and the full adaptation of the slope is less than the particular predefined value, controller 55 recognizes no error.

In the case where air mass flow meter 5 is recognized as error-free, injector 10 or, in general, the fuel supply, may also be monitored simultaneously with the described diagnosis and adaptation within the monitoring of throttle valve potentiometer 60. The described characteristic curve of injector 10 is first adapted by controller 55 to compensate for the deviation between the measured value of the oxygen concentration and the predefined value of the oxygen concentration. First, the idling operating state of the additive offset error is adapted until the absolute value of a change over time in the adaptation value, i.e., in the offset of the characteristic curve, is less than a value predefined therefor. Subsequently, the adaptation operation at this idling operation point is at least temporarily terminated and a switchover occurs to the second operating point, i.e., the partial load operating point close to idling. The adaptation operation is then performed at this point for the multiplicative slope error, again until the absolute value of the change over time in the corresponding adaptation value, i.e., in this case in the slope of the characteristic curve, is less than a value predefined therefor. Subsequently a switchover is performed to the idling operating state and the adaptation of the additive offset error is continued. The two operating points are alternatingly set for adaptation until a predefined number of operating point changes is reached. This predefined number of operating point changes defines a single monitoring or adaptation operation for the characteristic curve of injector 10. The adaptation of throttle valve potentiometer 60 and injector 10 may be performed simultaneously as described above if air mass flow meter 5 is error-free.

If, after the completion of the full adaptation, the absolute value of the change in the offset or in the slope due to the full adaptation of the offset or to the full adaptation of the slope is greater than a particular predefined value, controller 55 recognizes an error. The particular predefined value may be suitably calibrated on a test bench, for example. The error is displayed to the driver, for example. A limp-home operation may be initiated if necessary, which may be implemented, for example, by the suppression of fuel injection for one or more cylinders of internal combustion engine 1. Ultimately, internal combustion engine 1 may also be shut off; however, if, after the end of the full adaptation, both the absolute value of the change in the offset and in the slope due to the full adaptation of the offset and the full adaptation of the slope is less than the particular predefined value, controller 55 recognizes no error.

The predefined threshold value for recognizing an error of the sensor or of the actuator may be suitably calibrated, for example, on a test bench by not compensating via adaptation any deviations between the measured or set performance quantity and the threshold value predefined for the performance quantity which are attributable to an error of the sensor or the actuator, but rather by eliminating such deviations by replacing the corresponding component; in contrast, deviations between the measured or set performance quantity and the threshold value predefined for the performance quantity whose absolute value is less than the predefined threshold value are caused by installation or component tolerances or aging or wear and should be compensated via adaptation.

The particular predefined value for the change in the particular adaptation value over time may also be suitably calibrated on a test bench, for example, by reaching a compromise between speed and accuracy of adaptation. The predefined number of operating point changes for a single monitoring or adaptation operation may also be suitably calibrated, for example, on a test bench by reaching a compromise between speed and accuracy of the individual monitoring or adaptation operation.

The described diagnosis and/or adaptation method may be performed for any sensor or actuator of internal combustion engine 1 as described; one or more actuators and/or one or more sensors may be monitored simultaneously as described above, as long as the diagnosis or adaptation of such an actuator or sensor is not a precondition for the diagnosis or adaptation of another such actuator or sensor.

Figure 2:
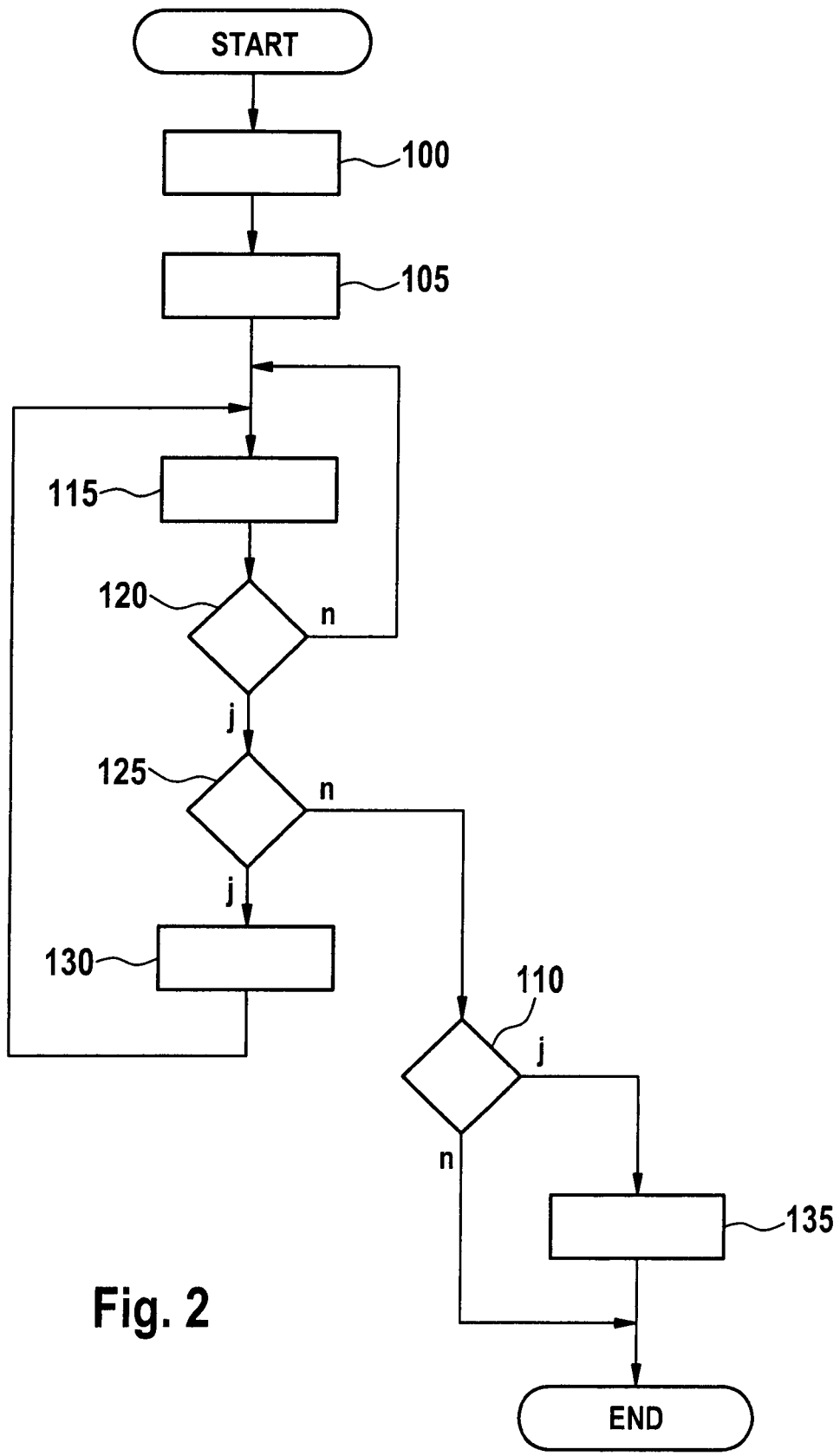
FIG. 2 shows a flow chart for an exemplary sequence of the method according to the present invention.

FIG. 2 shows a flow chart for an exemplary sequence of the method according to the present invention. After the start of the program, at a program point 100 the first operating point of internal combustion engine 1, for example, the idling operating point, is set by controller 55 and a numerical variable n is set to zero. The program then branches off to a program point 105.

At program point 105, controller 55 ascertains the performance quantity measured by the sensor or set by the actuator. In the described example, this is the air mass flow modeled from the signal of throttle valve potentiometer 60 in the case of the sensor, and in the described example this is the set value of the oxygen concentration in the exhaust gas set on the basis of the fuel quantity injected by injector 10 in the case of the actuator. The program then branches off to a program point 115.

At program point 115, depending on the instantaneous operating point, the additive offset error of the characteristic curve of the sensor or of the actuator, or the multiplicative slope error of the characteristic curve of the sensor or of the actuator is adapted by controller 55 as described above. The program then branches off to a program point 120.

At program point 120, controller 55 checks whether the absolute value of the change over time in the particular adaptation value is less than the value predefined therefor. If this is the case, the program branches off to a program point 125; otherwise the program branches back to program point 115 and the adaptation started there is continued.

At program point 125, controller 55 checks whether the numerical variable n is smaller than the predefined number of operating point changes. If this is the case, the program branches off to a program point 130; otherwise the program branches off to a program point 110.

At program point 110, controller 55 compares the change in the offset and the slope due to the full adaptation of the offset and to the full adaptation of the slope with the particular predefined value. If the absolute value of the change in the offset or in the slope due to the full adaptation of the offset or to the full adaptation of the slope is greater than a particular predefined value, controller 55 recognizes an error. If this is the case, the program branches off to a program point 135; otherwise the program is terminated.

At program point 135 an error of the sensor or of the actuator is recognized and optionally displayed. Optionally, a limp-home operation of internal combustion engine 1 is initiated as described above or ultimately the internal combustion engine is shut off. The program is subsequently terminated.

At program point 130 the operating point is changed by controller 55, i.e., switched over either from the first operating point to the second operating point or from the second operating point to the first operating point. In addition, numerical variable n is incremented by one. Subsequently the program branches back to program point 115, and the adaptation provided for the new operating point is performed or continued, i.e., for the first operating point the adaptation of the additive offset error and for the second operating point the adaptation of the multiplicative slope error.

The described sequence may be programmed, for example, in the form of a computer program having program code in controller 55. The described sequence may also be stored as program code on a machine-readable medium, the computer program product thus formed being executable on a microprocessor of controller 55. Controller 55 may represent a control and/or regulating device of internal combustion engine 1 or be implemented in the software and/or hardware of such a device.

Raising the engine speed for switching over from the first operating point to the second operating point results in an increase in the intake manifold pressure. However, by raising the intake manifold pressure, in the case where there is a leak in the intake manifold, i.e., in the part of air supply 15 downstream from throttle valve 20, rather less air is aspirated due to the leak than previously in the first operating state, i.e., in the idling operating state, so that the air mass flow supplied to combustion chamber 30 due to the leak is approximately the same or less in the first operating state and in the second operating state. However, since at the same time more air is aspirated via air supply 15, the additive offset error at the second operating state of the partial load close to idling is relatively less than in the first operating state of idling. Therefore, in the second operating state, the multiplicative slope error may be adapted without any appreciable influence on the offset error. In general, however, alternating the operating points according to the present invention during adaptation and thus similarly alternating the adaptation of the offset error and the multiplicative slope error until the predefined number of operating point changes is reached prevents the offset error from being also at least partially compensated when the multiplicative slope error is adapted and the multiplicative slope error from being at least partially also learned when the offset error is adapted. The greater the selected predefined number of operating point changes for a single monitoring or adaptation operation, the better may the adaptation of the offset error be separated from the adaptation of the slope error.

Since the described adaptation at the first operating point and at the second operating point is performed under steady-state operating conditions of internal combustion engine 1, no dynamic processes need to be compensated for during adaptation, so that the speed of adaptation may be raised compared to an adaptation in the presence of dynamic processes during the driving operation. The adaptation according to the present invention thus reaches steady state more rapidly and in a more stable manner compared to an adaptation during the driving operation in the presence of dynamic processes, which in turn results in considerable time savings.

Due to the method according to the present invention the duration of an adaptation at the end of the assembly line or in the repair shop may be substantially reduced, mainly when a plurality of adaptations, previously performed sequentially, are performed simultaneously. As described above, the adaptation reaches steady state considerably more rapidly than during the driving operation in the presence of dynamic processes because definite steady-state operating points are set. The separation of the additive offset error from the multiplicative slope error achieved in the adaptation according to the present invention makes a more accurate error analysis possible, in particular at the end of the assembly line or in the repair shop. With the aid of the method according to the present invention, vehicles having correctly adapted additive offset errors and correctly adapted multiplicative slope errors may be delivered from the end of the assembly line or from the repair shop. The adaptation learns the actual deviations at the corresponding operating points, i.e., the actual additive offset errors and the actual multiplicative slope errors because mutual influencing of the two errors is increasingly ruled out as the predefined number of operating point changes increases. For the repair shop, there is the option of performing a quick check of the sensors and/or actuators using the method according to the present invention to find a possible error or to determine whether the internal combustion engine functions properly again after a repair.

What is claimed is:

1. A method for operating an internal combustion engine, comprising:
 monitoring for a presence of a malfunction in at least one of a sensor for detecting and an actuator for setting a performance quantity of the internal combustion engine;
 wherein the monitoring is performed at a first operating point of the internal combustion engine at a first load level and at a second operating point of the internal combustion engine at a second load level that is higher than the first load level; and
 wherein both the first and second operating points are set alternatingly, and wherein at least one of the first and second operating points is set multiple times for a single monitoring operation.

2. The method as recited in claim 1, wherein an idling operating point of the internal combustion engine is selected as the first operating point, and wherein a partial load operating point of the internal combustion engine is selected as the second operating point.

3. The method as recited in claim 2, wherein the second operating point is set by at least one of raising the engine speed and applying a torque reserve starting from the first operating point.

4. The method as recited in claim 1, wherein the performance quantity at least one of measured by the sensor and set by the actuator is compared to a predefined reference value for a corresponding operating point to determine a difference, and wherein at least one of the sensor and the actuator is adapted in an adaptation process in order to correct the difference.

5. The method as recited in claim 4, wherein characteristic curves corresponding to the sensor and the actuator are provided, wherein the adaptation process involves adaptation of at least one of the characteristic curves, and wherein after the end of the adaptation process, an error is recognized if: a) the absolute value of a change in a linear offset relative to the corresponding characteristic curve is greater than a corresponding predefined value; and b) the absolute value of a change in a slope of the corresponding characteristic curve due to one of adaptation of the linear offset and adaptation of the slope is greater than a corresponding predefined value.

6. The method as recited in claim 4, wherein characteristic curves corresponding to the sensor and the actuator are provided, wherein the adaptation process involves adaptation of at least one of the characteristic curves, and wherein after the end of the adaptation process, no error is recognized if: a) the absolute value of a change in a linear offset relative to the corresponding characteristic curve is less than a corresponding predefined value; and b) the absolute value of a change in a slope of the corresponding characteristic curve due to one of adaptation of the linear offset and adaptation of the slope is less than a corresponding predefined value.

7. The method as recited in claim 5, wherein an additive offset error is adapted at the first operating point and a multiplicative slope error is adapted at the second operating point.

8. The method as recited in claim 6, wherein an additive offset error is adapted at the first operating point and a multiplicative slope error is adapted at the second operating point.

9. A method for operating an internal combustion engine, comprising:
    monitoring for a presence of a malfunction in at least one of a sensor for detecting and an actuator for setting a performance quantity of the internal combustion engine;
    wherein the monitoring is performed at a first operating point of the internal combustion engine at a first load level and at a second operating point of the internal combustion engine at a second load level that is higher than the first load level; and
    wherein both the first and second operating points are set alternatingly, and wherein at least one of the first and second operating points is set multiple times for a single monitoring operation;
    wherein the performance quantity at least one of measured by the sensor and set by the actuator is compared to a predefined reference value for a corresponding operating point to determine a difference, and wherein at least one of the sensor and the actuator is adapted in an adaptation process in order to correct the difference; and
    wherein during the adaptation process at one of the first and second operating points, if an absolute value of a change over time of an adaptation value is less than a corresponding predefined reference value, the adaptation is halted at least temporarily, and wherein the adaptation process is switched over to the other of the first and second operating points, and wherein the adaptation process is performed for the other of the first and second operating points.

10. The method as recited in claim 9, wherein the first and second operating points are alternatingly set for monitoring until a predefined number of operating point changes is reached.

11. The method as recited in claim 9, wherein at least one of: a) a plurality of sensors is monitored simultaneously; and b) a plurality of actuators is monitored simultaneously.

12. A computer-readable storage medium storing a computer program, wherein the computer program is configured to control, when executed by a computer, a method for operating an internal combustion engine, the method comprising:
    monitoring for a presence of a malfunction in at least one of a sensor for detecting and an actuator for setting a performance quantity of the internal combustion engine;
    wherein the monitoring is performed at a first operating point of the internal combustion engine at a first load level and at a second operating point of the internal combustion engine at a second load level that is higher than the first load level;
    wherein both the first and second operating points are set alternatingly, and wherein at least one of the first and second operating points is set multiple times for a single monitoring operation; and
    wherein the performance quantity at least one of measured by the sensor and set by the actuator is compared to a predefined reference value for a corresponding operating point to determine a difference, and wherein at least one of the sensor and the actuator is adapted in an adaptation process in order to correct the difference.

13. A control unit for an internal combustion engine, comprising:
    a means for monitoring for a presence of a malfunction in at least one of a sensor for detecting and an actuator for setting a performance quantity of the internal combustion engine;
    wherein the monitoring is performed at a first operating point of the internal combustion engine at a first load level and at a second operating point of the internal combustion engine at a second load level that is higher than the first load level; wherein both the first and second operating points are set alternatingly, and wherein at least one of the first and second operating points is set multiple times for a single monitoring operation; and
    wherein the performance quantity at least one of measured by the sensor and set by the actuator is compared to a predefined reference value for a corresponding operating point to determine a difference, and wherein at least one of the sensor and the actuator is adapted in an adaptation process in order to correct the difference.

* * * * *